United States Patent [19]

Robinson et al.

[11] 3,786,365

[45] Jan. 15, 1974

[54] LASER MATERIALS FROM CALCIUM FLUORIDE - RARE EARTH FLUORIDE EXPANDED LATTICE STRUCTURES

[75] Inventors: Morton Robinson, Malibu; Donald P. Devor, Santa Monica, both of Calif.

[73] Assignee: Hughes Aircraft Company, Culver City, Calif.

[22] Filed: Apr. 26, 1972

[21] Appl. No.: 247,539

Related U.S. Application Data

[60] Continuation-in-part of Ser. No. 875,127, Nov. 10, 1969, abandoned, which is a division of Ser. No. 607,041, Jan. 3, 1967, abandoned.

[52] U.S. Cl............... 331/94.5, 252/301.4, 330/4.3
[51] Int. Cl........ H01s 3/16, H01s 3/06, B01j 17/00
[58] Field of Search................. 331/94.5; 252/301.4; 330/4.3

[56] References Cited
UNITED STATES PATENTS

| | | | |
|---|---|---|---|
| 3,405,371 | 10/1968 | Johnson et al...................... | 331/94.5 |
| 3,453,215 | 7/1969 | Carnall, Jr. et al.............. | 252/301.1 |
| 3,533,956 | 10/1970 | Snitzer............................ | 252/301.2 |

Primary Examiner—David Schonberg
Assistant Examiner—R. J. Webster
Attorney—W. H. MacAllister et al.

[57] ABSTRACT

Stimulated emission at the approximate wavelengths of 840 nm, 1860 nm, 2050 nm, 2690 nm, and 2830 nm is obtained from birefrigent laser single crystals of calcium fluoride and the fluorides selected from the trivalent rare earth elements. Each crystal has a structure which deviates from the cubic lattice structure of calcium fluoride and tends toward the hexagonal lattice structure of the rare earth fluorides. The deivation in crystal structure is generally produced by increasing the percent by weight of the rare earth fluoride in excess of 3% and up to 50% of the crystalline solution. Examples of the fluorescent composition include $CaF_2:xErF_3:yYbf_3:zTmF_3:wHoF_3$, where $x$ varies from 3% to 50%, $y$ varies from 0% to 3%, $z$ varies from 0% to 3% and $w$ varies from 0% to 3% (all percent by weight). Other rare earth ions, having absorption bands which overlap the output spectrum of the pumping means over a wide region, may be used in place of erbium ions.

10 Claims, 7 Drawing Figures

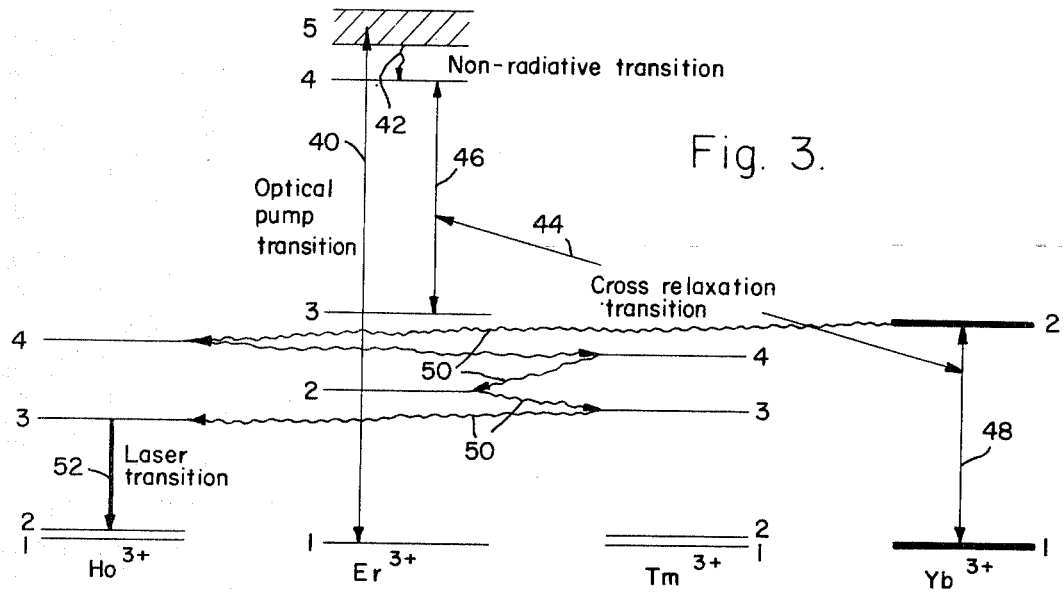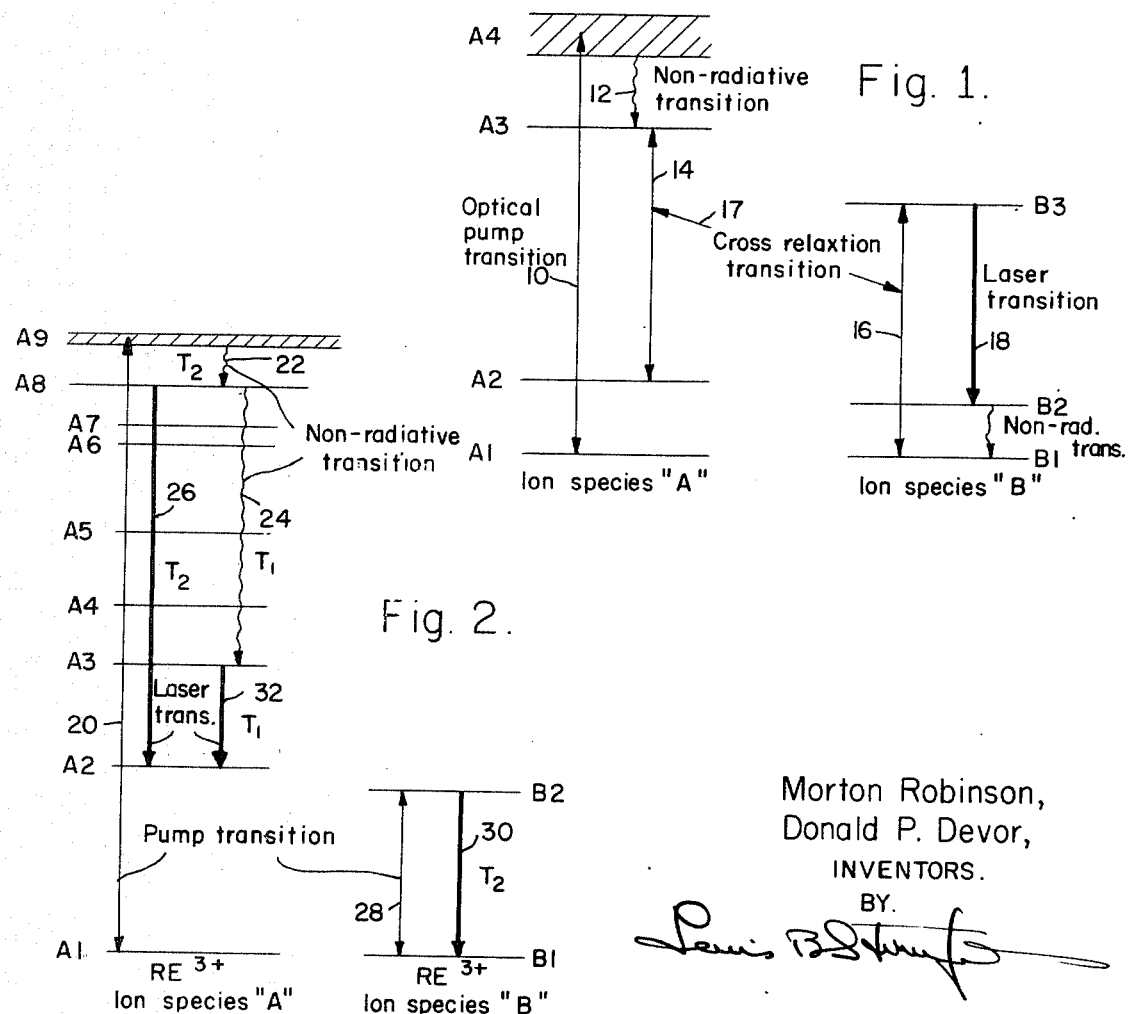

LASER MATERIALS FROM CALCIUM FLUORIDE - RARE EARTH FLUORIDE EXPANDED LATTICE STRUCTURES

The present application is a continuation-in-part of copending application, Ser. No. 875,127, filed Nov. 10, 1969, now abandoned which is a division of abandoned application Ser. No. 607,041, filed Jan. 3, 1967.

The present invention relates to a laser device utilizing a birefrigent material having an expanded lattice structure and comprising calcium fluoride and the trivalent rare earth fluorides. As used herein and described more fully hereinafter, an expanded lattice structure is a crystal having a strucutre which is intermediate to the hexagonal or orthorhombic structure of the rare earth fluorides and the cubic structure of calcium fluoride. Since the expanded lattice strucutre material is uniaxial birefrigent, selection of laser rod cylindrical axis with respect to crystal axis provides a choice of high or low laser gain activator ion transitions.

In prior laser devices, the materials utilized comprise host materials in which ions of the host are replaced by a dopant so that the crystalline structure of the host is substantially retained. In contradistinction to such prior laser materials, the present invention utilizes birefrigent materials having an expanded lattice structure, i.e., a solution of two or more solids which includes a non-stoichiometric and substantially one phase material and which physically is a solid crystal. The expanded lattice strucutre comprises at least one trivalent rare earth fluoride which is diluted by calcium fluoride (fluorite) in such a manner the the cubic fluorite structure has been expanded toward a hexagonal lattice structure of the crystal. Evidence of an expanded lattice strucutre is observed in X-ray powder patterns where the cubic structure of calcium fluoride is distorted and new emerging patterns indicating a hexagonal structure are noted. Consequently, the term, "expanded lattice structure," is defined to mean a structure which deviates from the cubic fluorite structure and which tends toward a hexagonal structure, i.e., a crystalline strucutre intermediate to the hexagonal structure of the rare earth fluoride and the cubic structure of calcium fluoride. In general, the deviation is produced by increasing the percent by weight of the rare earth fluoride in excess of three percent of the crystalline solution; however, the particular percent by weight for each rare earth fluoride will depend upon the particular physical properties thereof and those of the dilutant.

For example, in one embodiment of the present invention, a laser material comprises an expanded lattice structure of calcium fluoride-rare earth fluoride [(100-x-y) $CaF_2$:$xRE^1F_3$,:$yRE^2F_3$, etc., wherein $RE^1$ and $RE^2$ are different rare earths and x, y, etc. represent the percent by weight of the different rare earth fluorides]. The rare earth fluorides are selected from the trivalent rare earths singly or in combination as expressed in the composition of the above illustrative embodiment. Laser action at a particular wavelength depends primarily on the percent by weight inclusion of one or several rare earths, the temperature of the laser material, and the intensity of the pumping source.

As is well-known in the art, to obtain laser action, a particular single-doped or double-doped laser material is pumped from a ground energy level to a higher energy level wherein a part of the absorbed energy may be given up to the lattice in a non-radiative manner and wherein a population inversion of the active ions is cuased so that stimulated emission is obtained in an electronic transition from a metastable level to a lower energy level. The particular wavelength at which such a material lases depends upon the particular dopant, the temperature, the energy level to which the material is pumped, and the electronic interaction between dopant and host. It is further well-known that a double-doped host may be utilized in place of a single-doped host in order to transfer the energy from one dopant to the other by means of cross relaxation and/or energy transfer.

For efficient optical pumping of laser materials, as evidenced by low pumping thresholds, it is necessary that the absorption, or pump, band of the material overlap the output spectrum of the pump source over a wide region. In single-doped materials, the optical pumping bands consist of the energy levels of the active ion. In the double-doped materials, the pump energy is absorbed by activator and sensitizer pump levels and subsequently transferred to the laser metastable level activator ion.

In accordance with the present invention, the improved laser material comprises an expanded lattice strucutre comprising calcium fluoride and the fluorides consisting of the rare earths, singly or in combination, which are diluted by calcium fluoride. The amount of rare earth dopant placed in the solution depends primarily upon the desired degree of interaction between the rare earth ions and the desired optical density of laser pump levels.

In addition, the crystals formed from clacium fluoride and rare earth fluorides are easy to fabricate relative to known laser materials, are insoluble in water and organic solvents, have a high melting point, are relatively hard and adaptable to mechanical working.

The laser materials utilized in the present invention exhibit distinct advantages over prior laser materials. It has been found that the transfer of excitation within energy levels of some rare earth ions show marked dependence on temperature such that a change in a few hundred degrees Kelvin in the same crystal will produce laser action at even vastly separated wavelengths due to temperature dependent quenching. Thus, thermal switching results in laser action at differing wavelengths in the same crystal. At one temperature, excitation of an electronic state will relax in a non-radiative manner to a first metastable level by one or more of the above-noted processes at which point laser transition occurs to a lower terminal level at a specific wavelength. At another temperature the non-radiative process is altered so that the second metastable level is higher than the first, thus producing laser action at a different wavelength. A monocrystalline expanded structure of calcium fluoride-erbium fluoride-thulium fluoride (by weight percent, 87 $CaF_2$:12.5 $ErF_3$:0.5 $TmF_3$), for example, lases at about 2690 nm. (nanometers) at 298° K and at about 840 nm. at approximately 100° K for the thulium ions. Since the metastable levels are at different energies, it is necessary to correlate the threshold pumping energy therewith to obtain the necessary rise to the required $Er^{3+}$ and $Tm^{3+}$ energy level populations to obtain the desired laser transition.

Thus, for the same crystal which includes active ions having energy levels from which stimulated emission occurs as well as having wide absorption bands, there is a marked temperature dependence of the emission which results essentially from variation of the radiationless transfer of excitation from the laser pump levels to the first initial state of the laser transition. The temperature dependence results through quenching of one active ion fluorescence and enhancement of another fluorescence at relatively low temperatures, for example, of liquid nitrogen. Concentration quenching of the active ion fluorescence from excited states above the initial state of the laser transition allows the crystal having the above active ions to exhibit stimulated emission at a very high active ion concentration (e.g., 50% rare earth fluoride) and at a wavelength determined by the active ion concentration, the temperature, and the pumping energy.

In some laser transitions, the rare earth sensitizer ions can absorb the pump energy and subsequently transfer this energy to other rare earth ions through cross relaxation or other energy transfer. At least one of the other ions then exhibits stimulated emission or laser action, thus becoming the activator ion. The use of more than one ion is often necessary since the lasing ion may not be able to absorb the pump energy sufficient to obtain population inversion due to its lack of higher energy levels, a wide region of energy levels, and/or other physical properties.

In one embodiment an expanded lattice structure of calcium fluoride and erbium fluoride is used as the laser material. In another embodiment a small amount of thulium is placed in the expanded lattice structure of calcium fluoride-erbium fluoride in order to produce a distinct laser transition in the thulium by means of sensitization from the erbium and in order to produce two different and distinct laser transitions at two different and distinct wavelengths in the erbium, the particular transitions and cross relaxation being dependent upon the temperature of the laser material. Holmium fluoride and other rare earth fluorides may also be used instead of thulium fluoride. In a further embodiment the expanded lattice structure comprises calcium fluoride, erbium fluoride, ytterbium fluoride, thulium fluoride and holmium fluoride, so that a pulsed or continuous wave laser transition may be obtained from the holmium ions by means of cross relaxation and other energy transfer from the erbium, ytterbium and thulium ions. In all cases, the pumping occurs predominantly in the erbium ions to raise its energy to an excited state. A laser transition is thereafter produced upon transfer of the energy from the excited state of the erbium ions to the lasing ions including the erbium ions. Other rare earth ions, characterized by absorption bands which overlap the output spectrum of the pumping means over a wide region, may be used in place of erbium ions. In such a manner, pumping of the laser materials is made efficient since only a low threshold energy is required.

From the foregoing discussion, the performance of the above laser compositions of matter show unique material properties. These properties are a dependence on rare earth concentrations to yield the laser wavelength of interest, to provide laser pump level sensitization of the laser transition metastable level, to produce the expanded lattice structure and its characteristic birefrigence, and to thus allow the choice of high and low laser gain transitions resulting from that birefrigence.

It is, therefore, an object of the present invention to provide a laser device utilizing an improved laser material to provide stimulated emission at specific wavelengths.

Another object is the provision of such a laser device with a laser material having an expanded lattice structure.

Other aims and objects, as well as a more complete understanding of the present invention will appear from the following explanation of an exemplary embodiment and the accompanying drawings thereof, in which:

FIG. 1 is a generalized energy level diagram indicating the transitions which occur to produce laser action by means of a cross relaxation transition;

FIG. 2 is an energy level diagram indicating the transitions which occur to produce laser actions in ions of two rare earths at two different temperatures;

FIG. 3 is an energy level diagram depicting laser action in an expanded lattice structure including holmium, erbium, thulium and ytterbium ions;

Figure 4:
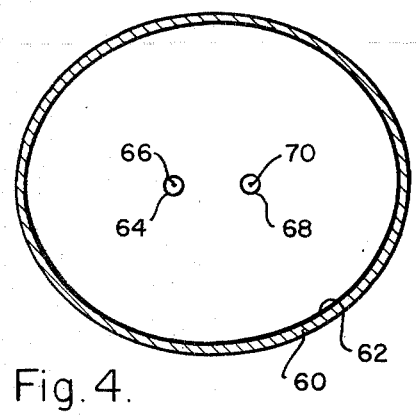
FIGS. 4 and 5 depict schematically one embodiment of a laser device for producing stimulated emission at varying wavelengths.

Accordingly, with reference to FIG. 1, and Ion Species "A" is depicted having four energy levels wherein level A1 is the ground energy state for Ion Species "A" and level A4 is a collection of energy levels which exist at sufficiently high energies to serve as optical pump levels so that laser operation may be produced. Ion Species "A" is pumped through an external source of energy to level A4 as indicated by arrow 10. Then, by giving up part of its energy to the lattice in a nonradiative manner, as shown by wavy arrow 12, Ion "A" is taken to its level A3. Thereafter, Ion "A" relaxes from level A3 to level A2 (as depicted by arrow 14) and the energy therefrom causes Ion Species "B" to be pumped (arrow 16) from its ground level B1 to its metastable initial laser transition level B3 through a cross relaxation transition (arrow 17) from which level B3 a laser transition (arrow 18) takes place down to terminal level B2. The population inversion in Ion Species "B" can be attained without requiring an inversion in Ion Species "A." Also, the rate of cross relaxation desirably is large compared with the nonradiative relaxation rates of level A3 or level B3.

It is to be understood that FIG. 1 is a generalized energy level diagram so that the exact positions of the energy levels of Ion Species "A" will vary with respect to the energy levels of Ion Species "B" in accordance with the particular rare earth ions in question. Consequently, Ion "A" may represent $Er^{3+}$ wherein levels A2 and A3 indicate energy levels of aproximately 6500 $cm^{-1}$ and 12,500 $cm^{+1}$, respectively (corresponding to levels of $^4I_{13/2}$ and $^4I_{9/2}$, respectively) and Ion "B" may represent $Tm^{3+}$ wherein levels B2 and B3 indicate energy levels of approximately 50 $cm^{-1}$ and 6000 $cm^{-1}$, respectively (corresponding to levels of $^3H_6$ and $^3H_4$, respectively). It is obvious, therefore, that level A2 would be higher than level B3. The same discussion is appropos to other combinations of rare earth ions.

Referring now to FIG. 2, trivalent rare earth ($RE^{3+}$) Ion Species "A" is pumped (arrow 20) from its ground level A1 to an excitation state A9 which comprises a broad band of energy levels into which the ions can easily be pumped. Then, depending upon the termperature of the laser device, the ions relax and undergo a non-radiative transition to either metastable level A8 (arrow 22) or metastable level A3 (arrows 22 and 24). At a relatively low crystal temperature $T_2$, e.g., 100° K, the relaxation is to level A8. The crystal then lases (arrow 26) down to level A2 in a stimulated emission of high energy and short wavelength. Stimulated emission is assisted by cross relaxation through transfer of the energy of the transition from level A2 to level A1 of species "A" through excitation of the transition from level B1 to level B2 of species "B" (as depicted by arrow 28). In addition, Ion Species "B" will lase (arrow 30) at a temperature $T_2$ from its level B2 to its level B1. At a higher temperature $T_1$, e.g., 298° K, the non-radiative transition (arrows 22 and 24) occurs from some higher energy level to metastable level A3, at which a laser transition (arrow 32) is initiated. The stimulated emission terminates at some lower level which may comprise level A2; however, the terminating level may be another level, depending upon the particular rare earth trivalent ion.

A laser having the characteristics described in FIG. 2 has been fabricated comprising calcium fluoride, erbium fluoride and thulium fluoride contained in an expanded lattice structure $(100-x-y)$ $CaF_2:xErF_3:yTmF_3$, where x and y represent the percent by weight of the erbium and thulium fluorides, respectively, and where $X = 5, 10, 12.5, 16.5$ and $20.5$ and where $y = 0.5$. Stimulated emission of the $^4I_{11/2}$ $^4I_{13/2}$ transition of $Er^{3+}$ at $2690 \pm 50$ nm. (nanometers) occurred at 298° K. At reduced temperatures of 100° K stimulated emission of the $^3H_4$ $^3H_6$ transition of $Tm^{3+}$ at 1860 nm. occurred even when $x = 50$. Thus, stimulated emission is here dependent upon the temperature which, in turn caused a quenching of the 2690 nm. emission of the trivalent erbium ions at 100° K. However, at the higher temperature of 298° K (essentially room temperature) $Er^{3+}$ lased at the infrared wavelength of 2690 nm. The threshold pump energy was increased for both stimulated emissions of $Er^{3+}$ and $Tm^{3+}$ as the ion concentration of erbium was increased beyond $x = 12.5$. Selective excitation of only the energy levels of $Er^{3+}$ produced fluorescence of $Tm^{3+}$ at 1860 nm. and thus demonstrated transfer of excitation from the energy levels of $Er^{3+}$ to $Tm^{3+}$. In addition, when the crystal was cooled at approximately 100° K, stimulated emission of the $^4S_{3/2}$ $^4I_{13/2}$ transition of $Er^{3+}$ at 840 nm. was observed. In order to obtain the high energy level excitation required to produce an 840 nanometer laser transition, a very high energy ultra-violet light of 2,000 joules maximum intensity was used. The above results indicate a very strong temperature dependence of sensitization of the $^4I_{11/2}$ energy level of trivalent erbium and illustrate the phenonenon of thermal switching.

In another laser material comprising $(100-x-y)$ $CaF_2$: $xErF_3:yHoF_3$, where $x = 12.5$ and $y = 0.5$ stimulated emission of the $^5I_6$ $^5I_7$ transition of $Ho^{3+}$ at 2840 nm. (298° K) and at 2830 nm. (cold nitrogen gas) was observed, thereby indicating the extremely small temperature dependence of the stimulated emission in the trivalent holmium ions.

FIG. 3 depicts an energy level diagram for a particular laser material comprising an expanded lattice structure consisting of calcium fluoride and of the fluorides of trivalent erbium, holmium, thulium, and ytterbium. Upon application of the pump energy to the laser crystal, a pump transition (arrow 40) occurs in $Er^{3+}$ from ground state 1 to the collection of excited energy levels 5. The ion then relaxes to metastable level 4 through a non-radiative transition as depicted by wavy arrow 41.

A cross relaxation transition 44 then occurs as the trivalent erbium ions relax from level 4 to level 3 as shown by arrow 46 to cause a pumping of $Yb^{3+}$ from its ground state 1 to its excited state 2 (arrow 48). Then, through energy transfer, as for example shown by wavy arrows 50, the trivalent holmium ions are brought to a metastable level 3. As shown in FIG. 3, the non-radiative transition, as illustrated by wavy arrows 50, may comprise a short circuit or a stepping deown from level 2 of $Yb^{3+}$ to level 4 of $Ho^{3+}$ to level 4 of $Tm^{3+}$ to level 2 of $Er^{3+}$ to level 3 of $Tm^{3+}$ to the metastable level 3 of $Ho^{3+}$. At this point a laser transition (arrow 52) occurs in the holmium ions from level 3 to level 2.

In one material consisting of 90.5 $CaF_2$:3 $ErF_3$: 3 $YbF_3$:3 $TmF_3$:0.5 $HoF_3$, by weight percent, pulsed laser action was produced from the trivalent holmium ions at wavelengths of 2060 nm. and 2050 nm. at the respective thresholds and temperatures of 100 joules, 298° K and 16 joules, 100° K (cold nitrogen gas).

In another crystal consisting of 83.5 $CaF_2$:10 $ErF_3$: 3 $YbF_3$:3 $TmF_3$:0.5 $HoF_3$, by weight percent, continuous laser operation was obtained at a wavelength of 2060 nm. Pumping was accomplished by a 650W quartz iodine lamp and the crystal was cooled by a high flow of cold nitrogen gas. A continuous wave laser at approximately 2060 nm. is also obtainable from crystals containing the fluorides of calcium, erbium, ytterbum, thulium and holmium according to the crystal solution composition of $(100-x-y-z-w)$ $CaF_2$: $xErF_3:yYbF_3:zTmF_3:wHoF_3$, wherein, w, x, y, z represent the percent by weight of the respective trivalent rare earth fluorides and wherein $x = 10\% - 15\%$, $y = 1\% - 3\%$, $z = 1\% - 3\%$, and $w = 0.5\% - 3\%$. In both the pulsed and CW cases, energy transfer is obtained from the many absorption bands of $Er^{3+}$, $Yb^{3+}$ and $Tm^{3+}$ which in turn transfer the energy to the metastable level of the lasing ion $Ho^{3+}$, thus indicating a very high efficiency of pumping.

In the above examples, laser rods 2 mm diameter by 25 mm long for the continuous wave laser and 3 mm diameter by 25 mm long for the other lasers were ground from the crystal boules. The rod ends were polished with a 2m. radius of curvature. Silver was evaporated onto the ends, one end opaque and the other 2% transmitting. Laser threshold was determined with the crystal contained in a quartz dewar mounted in an elliptical cavity. A 650 watt quartz iodine lamp was used as the pumping means for the continuous wave laser and a xeon lamp such as a PEK XE 1 – 3 linear flash lamp was used for the other lasers. The data relating to these materials are tabulated as follows:

| Crystal (wt. percent) | Lasing ion | Wavelength (nanometers) | Threshold (joules, W) | Temperature |
|---|---|---|---|---|
| 87.5$CaF_2$:12.5$ErF_3$ | $Er^{3+}$ | 2,690 | 14 J | 298° K. |

| Crystal (wt. percent) | Lasing ion | Wavelength (nanometers) | Threshold (joules, W) | Temperature |
|---|---|---|---|---|
| 94.5CaF$_2$:5ErF$_3$:0.5TmF$_3$ | Tm$^{3+}$ | 1,860 | 17.5 J | Cold N$_2$ gas.** |
| | Er$^{3+}$ | 2,690 | 35 J | 298° K. |
| 89.5CaF$_2$:10ErF$_3$:0.5TmF$_3$ | Tm$^{3+}$ | 1,860 | 14 J | Cold N$_2$ gas.** |
| | Er$^{3+}$ | 840 | 2,000* J | Do. |
| | Er$^{3+}$ | 2,690 | 24 J | 298° K. |
| 87CaF$_2$:12.5:ErF$_3$:0.5TmF$_3$ | Tm$^{3+}$ | 1,860 | 5 J | Cold N$_2$ gas.** |
| | Er$^{3+}$ | 840 | 2,000* J | Do. |
| | Er$^{3+}$ | 2,690 | 10 J | 298° K. |
| 83CaF$_2$:16.5ErF$_3$:0.5TmF$_3$ | Tm$^{3+}$ | 1,860 | 7 J | Cold N$_2$ gas.** |
| | Er$^{3+}$ | 840 | 2,000* J | Do. |
| | Er$^{3+}$ | 2,690 | 11.5 J | 298° K. |
| 79CaF$_2$:20.5ErF$_3$:0.5TmF$_3$ | Tm$^{3+}$ | 1,860 | 11 J | Cold N$_2$ gas.** |
| | Er$^{3+}$ | 840 | 2,000* J | Do. |
| | Er$^{3+}$ | 2,690 | 21 J | 298° K. |
| 49.5CaF$_2$:50ErF$_3$:0.5TmF$_3$ | Tm$^{3+}$ | 1,860 | 18.5 J | Cold N$_2$ gas.** |
| 87CaF$_2$:12.5ErF$_3$:0.5HoF$_3$ | Ho$^{3+}$ | 2,830 | 16 J | Cold N$_2$ gas.** |
| | Ho$^{3+}$ | 2,840 | | 298° K. |
| 90.5CaF$_2$:3ErF$_3$:3YbF$_3$:3Tm$_3$:0.5HoF$_3$ | Ho$^{3+}$ | 2,050 | 16 J | Cold N$_2$ gas.** |
| | Ho$^{3+}$ | 2,060 | 100 J | 298 K. |
| 83.5CaF$_2$:10ErF$_3$:3YbF$_3$:3TmF$_3$:0.5HoF$_3$ | Ho$^{3+}$ | 2,060CW | 650 watts | Cold N$_2$ gas.** |

*An ultraviolet lamp having a maximum input of 2,000 joules was used. Therefore, the exact threshold at which the 840 nm. output was obtained was not determined.
**The temperature was estimated at approximately 100° K.

Figure 5:
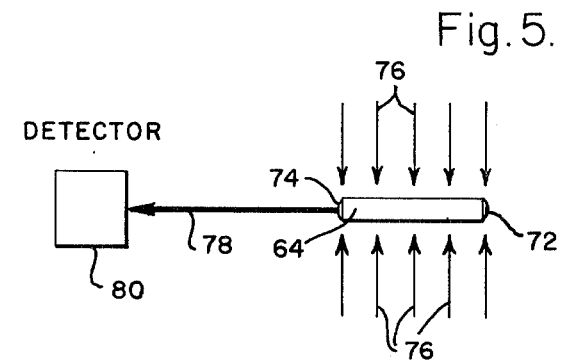

A laser device utilizing the materials described above is shown in FIGS. 4 and 5. The device includes an elliptical cavity 60 having a highly polished inner surface 62. A laser rod or crystal 64 is positioned at one focus 66 while an optical pumping lamp 68 is positioned at the other focus 70 of the cavity. A quartz dewar is provided about crystal 64 for support and temperature control thereof. Consequently, upon activation of lamp 68, the energy therefrom will optically pump the crystal either directly or upon reflection from inner surface 62 to effect a stimulated emission from the crystal. Rod 64, as depicted in FIG. 5, is provided with a fully silvered end 72 and a partially silvered end 74 so that electronic energy will be fully reflected from end 72 and partially reflected from end 74. As described in FIGS. 1—3, upon application of sufficient pumping light to the rod as depicted by arrows 76, an optical pumping transition, energy transfer, and a laser transition occur within crystal 64 between ends 72 and 74. An output of monochromatic coherent radiation is produced and passes through partially silvered end 74 as depicted by arrow 78. A detector 80 may be placed in front of a coherently emitted radiation for observation thereof. Although a particular laser device has been described, it is to be understood that the material may be used in optical cavities other than the elliptical cavity described above.

Figure 6:
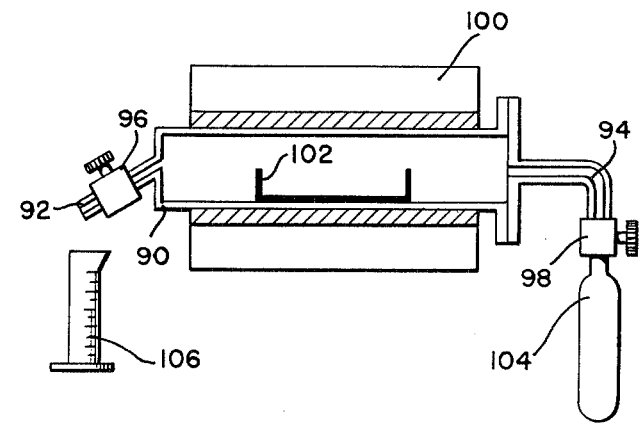
FIGS. 6 and 7 depict one method for producing laser materials described herein.
Figure 7:
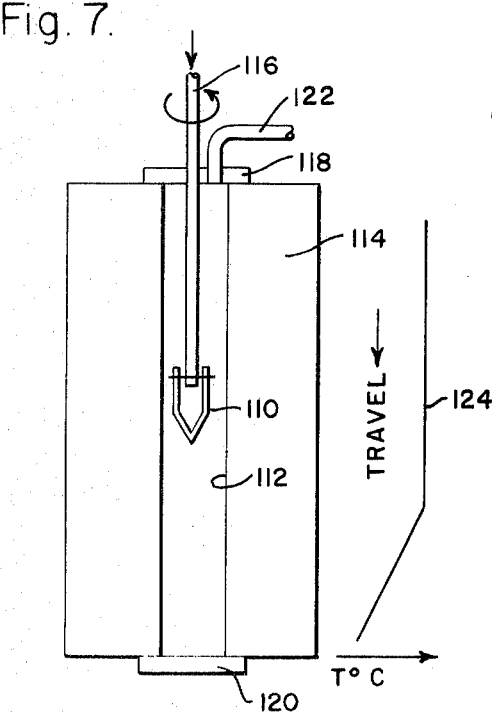

The laser materials provided in accordance with the present invention may be fabricated by use of the equipment depicted in FIGS. 6 and 7 and as described in the "Journal of Applied Physics," Vol. 37, No. 5, pp. 2072—2074, April 1966, and in U.S. Pat. No. 3,649,552. Commercially obtained rare earth oxides are first purified by an ion exchange technique wherein separation takes place within an ion exchange column. The rare earth oxide is dissolved in hydrochloric acid and added at the top of the column which is then washed with water until the proper effluent pH is at the desired level. The rare earth is next diluted with diethylenetriamine penta acetic acid (DTPA) and ethylene diamine tetra acetic acid (EDTA) to remove impurities and to separate the rare earth. The column may be heated. Thereafter, the rare earth is removed from the column and precipitated as an oxalate by the slow addition of saturated oxalic acid solution. The oxalate material is oven dried, placed in quartz trays and burned to the oxide in the furnace.

The rare earth oxide is then reacted with hydrogen fluoride gas to form a rare earth fluoride according to the following equation: RE$_2$O$_3$ (s) + 6HF (g) 2 REF$_3$(s) + H$_2$O (g), in the equipment shown in FIG. 6. The equipment comprises a tube 90 of "INCONEL" (Trademark of the International Nickel Company, Inc.) having an outlet 92 at one end thereof and a hydrogen fluoride inlet 94 at the other end. A needle valve 96 is placed in outlet 92 and a second needle valve 98 is placed in inlet 94. Tube 90 is surrounded by a furnace 100 and a platinum tray 102 is disposed within the tube for reception of the rare earth oxide.

In operation, the rare earth oxide is loaded into tray 102. An aspirator pump is secured to outlet 92 to evacuate the tube through open valve 96 while valve 98 remains closed. During evacuation the temperature of the furnace and the oxide is raised to 800° C. Valve 96 is then closed, the aspirator pump is disconnected, and needle valve 98 is opened to allow hydrogen fluoride from a cylinder 104 to expand into tube 90. Valve 96 is gradually opened until a small efflux of hydrogen fluoride is detected. The hydrogen fluoride gas stoichiometrically reacts with the rare earth oxide as set forth in the above equation to convert the oxide into a rare earth fluoride and into water vapor. The vapor condenses at the outlet end of the tube and drips through the outlet into a graduate 106. When the stoichiometric amount of water has been collected in container 106, the conversion is completed. An excess of approximately 10% of hydrogen fluoride is used.

The rare earth fluoride is combined with a commercially obtainable pure calcium fluoride within a crucible 110 (see FIG. 7) in the proper amounts to form the desired crystal of laser material. The mixture is first fused in the presence of a small partial pressure of hydrogen fluoride in a helium atmosphere to eliminate slight traces of rare earth oxyfluoride which may have remained from the step utilizing the equipment depicted in FIG. 6. The material and crucible are then placed within the interior 112 of a furnace 114 at the end of a rod 116. Plates 118 and 120 are secured at both ends of interior 112. An inlet 122 is provided in plate 118. The furnace is provided with heating elements to provide a temperature curve and gradient as depicted by curve 124. An ambient atmosphere of pure helim is provided in the furnace interior through tube 122. The temperature of the furnace is slowly raised to above the melting point of the calcium fluoride-rare earth mixture at which time hydrogen fluoride flows into the furnace through tube 122. The temperature is further increased above the melting point of the mixture to lower the viscosity of the melt, to provide for complete mixing of the fluroides, and to remove bubbles therefrom. Thereafter, the crucible is lowered through the furnace and the gradient at a rate commensurate with the rate of growth of the crystals. At the end of growth region, the crystal is annealed, the time required therefor being dependent upon the mateial, the crucible, and the dimensions of the crystal. The crystals are then slowly and partially cooled, the hydrogen fluoride flow is halted and the furnace is cooled to room temperature. The crystals are then removed from the crucible and ground into laser rods.

Although the invention has been described with reference to particular embodiments thereof, it should be realized that various changes and modifications may be made therein without departing from the spirit and scope of the invention.

We claim:

1. A laser system for producing coherent radiation comprising a monocrystalline expanded lattice structure intermediate a cubic structure and a hexagonal structur consisting essentially of a homogeneous distribution of calcium fluroide and at least one fluoride compound selected from the group consisting of the trivalent rare earth fluorides, pumping means including an optical pump source optically coupled to said structure for pumping said structure and for producing an excitation of energy levels and a population inversion of an electronic transition between the energy levels of the ions of said rare earth fluorides within said expanded lattice structure, and means coupled to said structure for stimulating the coherent radiation from said ions at a wavelength corresponding to the electronic transition, wherein the wavelength and the electronic transition of the coherent radiation is dependent upon the temperature of said expanded lattice structure.

2. A laser system as in claim 1 wherein the ions of said rare earth fluorides consist essentially of trivalent erbium and wherein the percentage by weight of said erbium fluoride is about 12.5 percent and further including temperature control means coupled to said expanded lattice structure for providing the temperature of said expanded lattice structure at 298° K whereby the wavelength of the coherent radiation is produced at approximately 2690 nanometers.

3. A laser system as in claim 1 wherein the ions of said rare earth fluorides comprise trivalent erbium and trivalent thulium and wherein the percentage by weight of said erbium fluoride is 10 to 23 percent and the percentage by weight of said thulium fluoride is approximately 0.5 percent and further including temperature control means coupled to said expanded lattice structure for providing the temperature thereof at about 100° K ± 30° K whereby the wavelength of the coherent radiation is produced at about 840 nanometers.

4. A laser system as in claim 1 wherein one ion of said rare fluorides is trivalent holmium and further including temperature control means coupled to said expanded lattice structure for providing the laser wavelength at approximately 2830 nanometers.

5. A laser system as in claim 1 wherein at least one ion of said rare earth fluorides is trivalent thulium and further including temperatur control means coupled to said structure for providing the temperature thereof at about 100° K ± 50° K whereby the wavelength of the coherent radiation is produced at 1860 nanometers.

6. A laser system as in claim 1 wherein the ions of said rare earth fluorides consist of erbium, ytterbium, thulium and holmium and further including temperature control means coupled to said structure for providing the specified temperature thereof at about 298° K and about 100° K ± 30° K to produce cross relaxation and energy transfer to said holmium ions to cause a laser transition is said holmium ions at the respective wavelengths of approximately 2060 nanometers and 2050 nanometers.

7. A laser system as in claim 7 wherein the percentage by weight of said erbium fluoride is about 10 to 15 percent, of said ytterbium fluoride is about 1 to 3 percent, of said thulium fluoride is about 1 to 3 percent and of said holmium fluoride is about 0.5 to 3 pecent, said temperature control means providing the structure temperature at about 100° K, thus producing continuous coherent radiation.

8. A laser system for producing momochromatic coherent radiation continuously at a wavelength of approximately 2060 nanometers comprising a substantially monocrystalline structure intermediate a cubic structure and a hexagonal structure consisting essentially of about 83.5% calcium fluoride by weight, about 10 % erbium fluoride by weight, about 3% ytterbium fluoride by weight, about 3% thulium fluoride by weight and about 0.5% holmium fluoride by weight, pumping means including an optical pump source optically coupled to said structure for pumping said structure and for producing a population inversion at specified electronic energy levels of ions of said holmium within said momocrystalline structure at the temperature of cold nitrogen gas by means of cross relaxation and energy transfer to said holmium ions and means coupled to said structure for stimulating the coherent radiatin at the wavelength.

9. A laser system for producing a continuous wave, momochromatic coherent radiation comprising a substantially momocrystalline expanded lattice structure intermediate a cubic structure and a hexagonal structure consisting essentially of calcium fluroide, erbium fluoride, ytterbium fluoride, thulium fluoride, and holmium fluoride, pumping means including an optical pump source optically coupled to said structure for pumping said structure and for producing a population inversion at specified electronic energy levels of ions of said holmium within said expanded lattice structure at a specified temperature by means of cross relaxation and energy transfer to said holmium ions, and means coupled to said structure for stimulating the coherent radiation as a result of the population inversion.

10. A laser system for producing momochromatic coherent radiation at different wavelengths comprising a substantially momocrystalline expanded lattice structure intermediate a cubic structure and a hexagonal structure consisting essentially of fluoride compounds selected from the group consisting of divalent calcium ion fluorides and the trivalent rare earth ion fluorides, pumping means including an optical pump source coupled to said structure for pumping said structure and for producing energy transfer between specified energy levels of the ions of said rare earth ion fluorides within said expanded lattice structure, and means coupled to said structure for stimulating the coherent radiation from said structure at the different wavelengths, at least one ion of said trivalent rare earth ion fluorides having energy levels absorption bands overlapping the output spectrum of said pumping means over a wide region.

* * * * *